(12) United States Patent
Hung

(10) Patent No.: US 8,791,926 B2
(45) Date of Patent: Jul. 29, 2014

(54) PROJECTION TOUCH SYSTEM FOR DETECTING AND POSITIONING OBJECT ACCORDING TO INTENSITY DIFFERENT OF FLUORESCENT LIGHT BEAMS AND METHOD THEREOF

(75) Inventor: Min-I Hung, Hsinchu (TW)

(73) Assignee: Lite-On Technology Corporation, Taipei (TW)

( * ) Notice: Subject to any disclaimer, the term of this patent is extended or adjusted under 35 U.S.C. 154(b) by 213 days.

(21) Appl. No.: 13/544,610

(22) Filed: Jul. 9, 2012

(65) Prior Publication Data

US 2014/0009443 A1   Jan. 9, 2014

(51) Int. Cl.
*G06F 3/042* (2006.01)
(52) U.S. Cl.
USPC ........................................................ 345/175
(58) Field of Classification Search
CPC ..... G06F 3/0421; G06F 3/0412; G06F 3/042; G06F 3/03545
USPC ...................... 345/173, 175; 178/18.03–18.09
See application file for complete search history.

(56) References Cited

U.S. PATENT DOCUMENTS

| 2009/0091553 | A1* | 4/2009 | Keam et al. | 345/175 |
| 2010/0188340 | A1* | 7/2010 | Smoot | 345/173 |
| 2012/0274593 | A1* | 11/2012 | Chiang | 345/173 |

* cited by examiner

*Primary Examiner* — Chanh Nguyen
*Assistant Examiner* — Jonathan Blancha
(74) *Attorney, Agent, or Firm* — McClure, Qualey & Rodack, LLP

(57) ABSTRACT

A projection touch system configured for detecting a position of a touch object and a projection touch method thereof are provided. The projection touch system includes an invisible light source, a projection panel and a light detector. The projection panel includes a transparent plate and a fluorescent film. An invisible light beam emitted by the invisible light source scans back and forth on the projection panel. A first fluorescent light beam and a second fluorescent light beam are emitted from the fluorescent film excited by the invisible light beam. When the touch object is touched to the projection panel, a portion of the invisible light beam is reflected to the fluorescent film, and the second fluorescent light beam is emitted. The light detector detects the second fluorescent light beam relative to the first fluorescent light beam by an intensity level to determine the position of touch object.

15 Claims, 7 Drawing Sheets

PROJECTION TOUCH SYSTEM FOR DETECTING AND POSITIONING OBJECT ACCORDING TO INTENSITY DIFFERENT OF FLUORESCENT LIGHT BEAMS AND METHOD THEREOF

BACKGROUND OF THE INVENTION

1. Field of the Invention

The present invention generally relates to a touch system and a touch method thereof, and more particularly to a projection touch system and a projection touch method thereof

2. Description of Related Art

With the development of the electronic technology and the optical technology, the projection touch system is widely used by portable devices to solve the inconvenience of carrying and using the physical input interface. Through the projection touch system, users may input information as using the physical input interface without holding the heavy device.

For correctly inputting the information, a virtual input image in conventional projection touch system is provided to users, and a detecting system detects and analyzes a relative position of the user on the virtual input image. FIG. 1 illustrates a schematic diagram of a projection touch system in the related art. Referring to FIG. 1, a virtual input image 110 is provided to a user on a projection plane 120 by a projection touch system 100. The detecting system 130 performs scanning by a detecting light beam 132a from one side of the virtual input image 110. When the detecting light beam 132a encounters the user's finger U1 or any object manipulated by the user, a reflected light beam 132b or a scattered light beam 132c may be detected by detectors 134, and the position of the user's finger U1 can be obtained by the detecting system 130. However, a dead zone is also formed on the projection plane 120 due to the block of the user's finger U1. The detecting system 130 is unable to detect another object behind the user's finger U1 in the dead zone. Accordingly, the information inputted by the user may be incomplete.

Therefore, to provide a projection touch system eliminating the dead zone with fewer elements is still a main topic for the persons skilled in this art.

SUMMARY OF THE INVENTION

The invention is directed to a projection touch system and a projection touch method thereof, and the projection touch system is capable of detecting and positioning at least one objects.

An exemplary embodiment of the present invention provides a projection touch system including an invisible light source, a projection panel and a light detector. The projection touch system is configured for detecting a position of a touch object. The invisible light source disposed at a fist side of the projection panel emits an invisible light beam. The projection panel includes a transparent plate and a fluorescent film. The fluorescent film is disposed between the transparent plate and the invisible light source, and the invisible light beam scans back and forth on the projection panel. When the invisible light beam penetrates through the transparent plate and the fluorescent film, the fluorescent film excited by the invisible light beam emits a first fluorescent light beam. In addition, when the touch object is near or touched to the projection panel from a second side of the projection panel opposite to the first side, the invisible light beam reaches to the touch object, and at least a portion of the invisible light beam is further reflected by the touch object back to the fluorescent film, the fluorescent film excited by the invisible light beam emits a second fluorescent light beam. The light detector disposed at the first side of the projection panel detects the second fluorescent light beam relative to the first fluorescent light beam by an intensity level.

Another exemplary embodiment of the present invention provides a projection touch method adapted for a projection touch system to detect a position of a touch object. The projection touch method includes: providing an invisible light beam to scan back and forth on a projection panel, detecting a fluorescent light beam emitted from a fluorescent film in the projection panel by a light detector, wherein the fluorescent light beam in intensity level is distinct as a first fluorescent light beam and a second fluorescent light beam, and analyzing the second fluorescent light beam to find the position of the touch object. The first fluorescent light beam is emitted from the fluorescent film when the invisible light beam penetrates the projection panel. The second fluorescent light beam is emitted from the fluorescent film when the invisible light beam reaches the touch object and at least a portion of the invisible light beam is further reflected by the touch object back to the fluorescent film as the touch object is near or touched to the projection panel.

According to the above descriptions, the projection touch system provided in the exemplary embodiment detects the position of the touch object by detecting the fluorescent light beam emitted by the fluorescent film. When the touch object is near or touched to the projection panel, the second fluorescent light beam is emitted by the fluorescent film and is detected by the light detector. Therefore, the position of the touch object can be recognized by analyzing the second fluorescent light beam.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DETAILED DESCRIPTION OF DISCLOSED EMBODIMENTS

Figure 1:
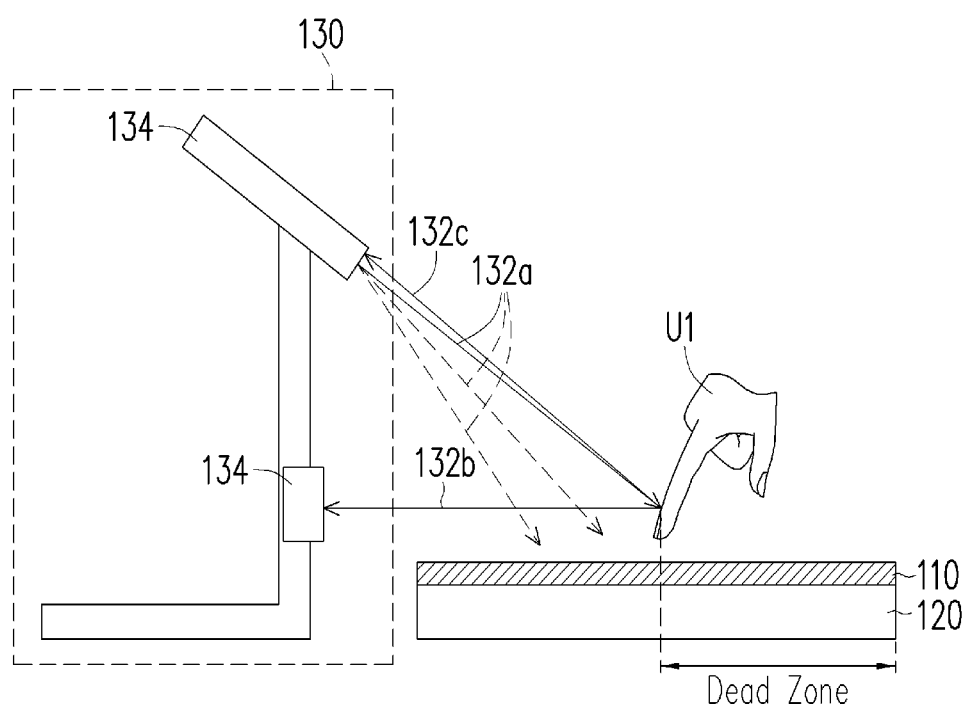
FIG. 1 illustrates a schematic diagram of a projection touch system in the related art.
Figure 2A:
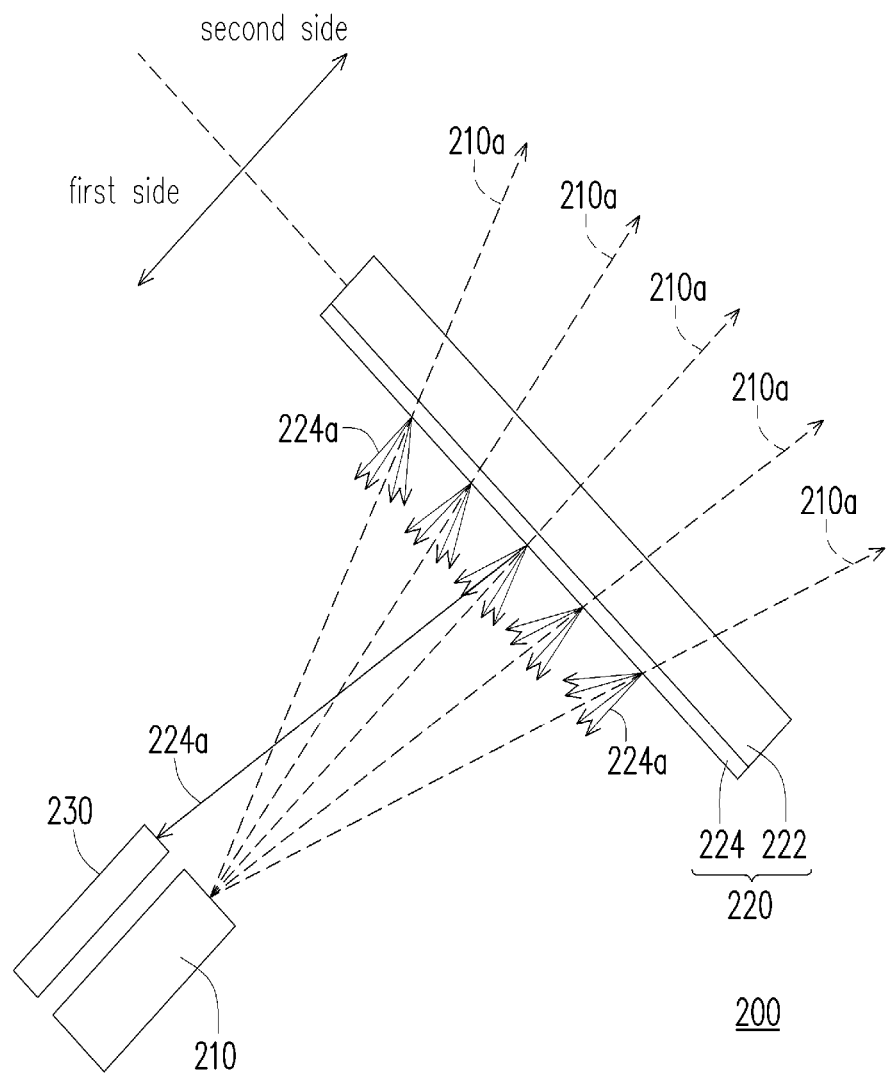
FIG. 2A and FIG. 2B illustrate a side view of a projection touch system according to an exemplary embodiment of the present invention.
Figure 2B:
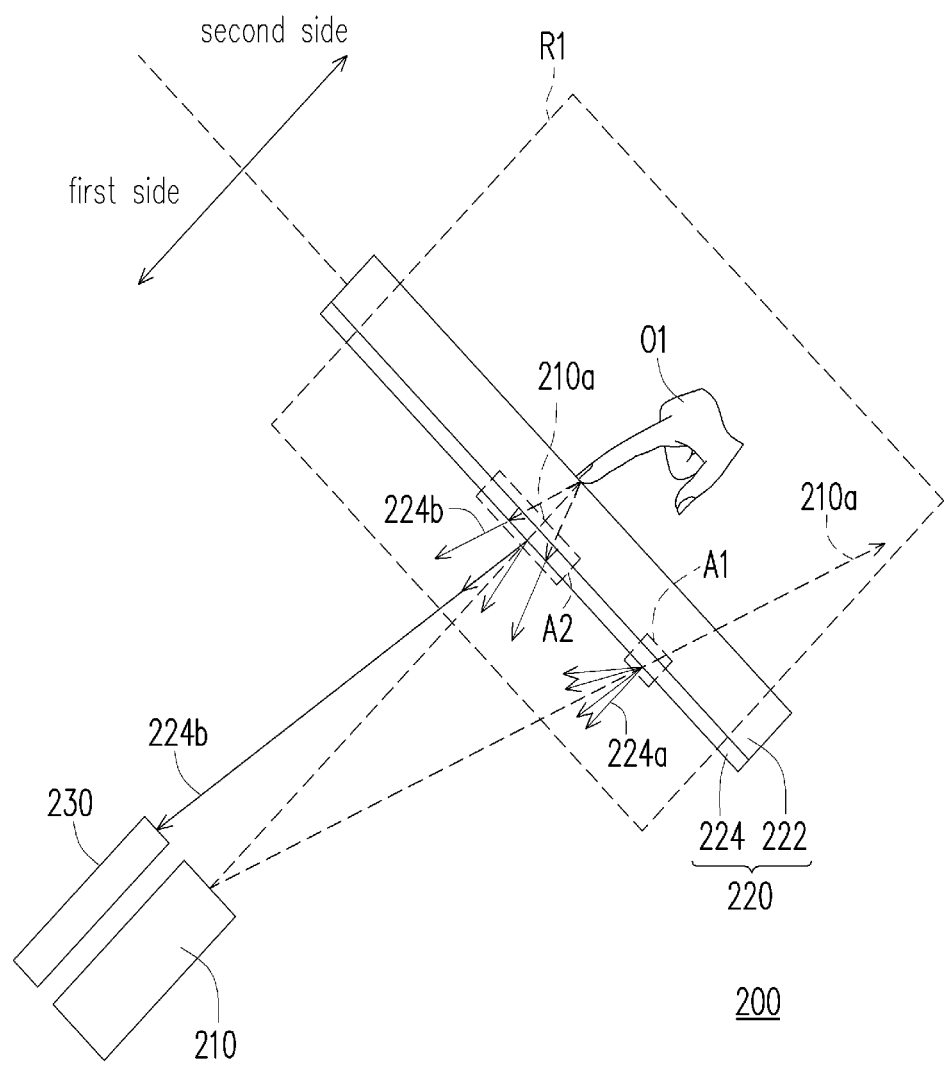

FIG. 2A and FIG. 2B illustrate a side view of a projection touch system according to an exemplary embodiment of the present invention. The projection touch system is capable of detecting a position of a touch object. Referring to FIG. 2A, a projection touch system 200 includes an invisible light source 210, a projection panel 220 and a light detector 230. The invisible light source 210 disposed at a first side of the projection panel 220 is capable of emitting an invisible light beam 210a, and the invisible light beam 210a scans back and forth on the projection panel 220 like the raster scan method. The projection panel 200 includes a transparent plate 222 and a fluorescent film 224. The fluorescent film 224 is disposed between the transparent plate 222 and the invisible light source 210, and the fluorescent film 224 can be chosen according to the design of the projection touch system 200. To be more specific, the fluorescent film 224 is chosen to emit a fluorescent light excited only by the invisible light beam 210a. For example, the fluorescent film 224 can be chosen to be excited only by the invisible light beam 210a which is an infrared beam, and the color of the fluorescent light can be red, blue or other colors.

When the invisible light beam 210a scans on the projection panel 220, the invisible light beam 210a penetrates through the fluorescent film 224 and the transparent plate 222. Based on the design in the present exemplary embodiment, the fluorescent film 224 is excited by the invisible light beam 210a, and a first fluorescent light beam 224a is emitted by the fluorescent film 224. The light detector 230 is disposed at the first side of the projection panel 220 with the invisible light source 210 and used to detect the first fluorescent light beam 224a emitted from the fluorescent film 224. Since there is no touch object on the projection panel 220, the invisible light beam 210a penetrates through the projection panel 220 towards a second side of the projection panel 220 opposite to the first side.

In one embodiment of the present invention, the invisible light beam is the infrared beam, and the light detector is a photodiode. However, the present invention is not limited thereto.

Referring to FIG. 2B, the touch object O1, such as a finger of a user, is touched to the projection panel 220. When the touch object O1 is near or touched to the projection panel 220 from the second side of the projection panel 220, the invisible light beam 210a reaches the touch object O1, and at least a portion of the invisible light beam 210a is further reflected (and scattered) by the touch object O1 back to the fluorescent film 224. Therefore, the fluorescent film 224 excited by the invisible light beam 210a emits a second fluorescent light beam 224b. Accordingly, the second fluorescent light beam 224b can also be detected by the light detector 230. Furthermore, the light detector 230 detects the second fluorescent light beam 224b relative to the first fluorescent light beam 224a by an intensity level. Moreover, the longer the touch object O1 stays on the projection panel 220, the greater intensity level of the second fluorescent light beam 224b will be.

Figure 2C:
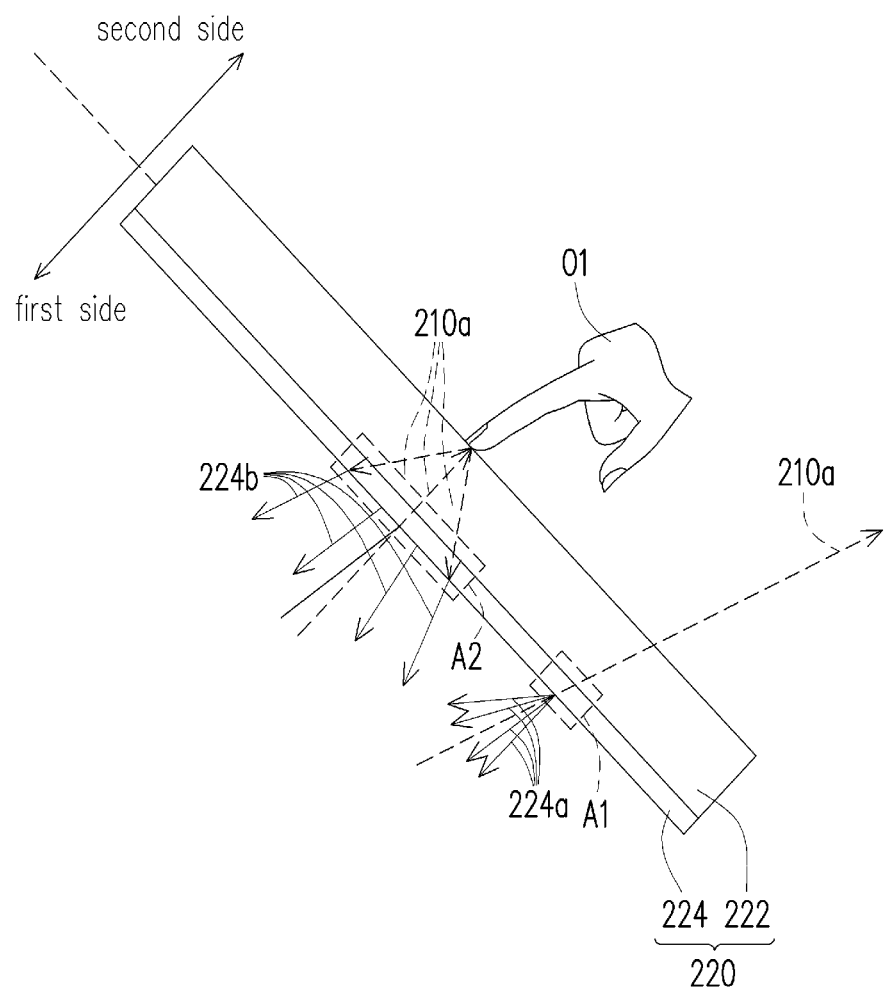
FIG. 2C is a close view of a region R1 in FIG. 2B according to an exemplary embodiment of the present invention.

In one embodiment of the present invention, the light detector 230 includes an analyze unit (not illustrated). The analyze unit use the intensity difference between the first fluorescent light beam 224a and the second fluorescent light beam 224b to find the position of the touch object O1. Referring to FIG. 2C, FIG. 2C is a close view of a region R1 in FIG. 2B according to the exemplary embodiment of the present invention. When the invisible light beam 210a penetrates through the projection panel 220 without the blocking of touch object O1, a first area A1 of the fluorescent film 224 is excited by the invisible light beam 210a to emit the first fluorescent light beam 224a. However, when the touch object O1 is touched to the projection panel 220 from the second side of the projection panel 220 opposite to the first side, the invisible light beam 210a reaches the touch object O1 through the fluorescent film 224, and at least a portion of the invisible light beam 210a is reflected (and scattered) by the touch object O1 back to the fluorescent film 224. Therefore, a second area A2 of the fluorescent film 224 is excited by the invisible light beam 210a to emit the second fluorescent light beam 224b. Since the second area A2 of the fluorescent film 224 is larger than the first area A1 of the fluorescent film 224, the intensity of the second fluorescent light beam 224b is greater than that of the first fluorescent light beam 224a.

A method of detecting and analyzing the position of the touch object O1 in the present invention is provided below. The light detector 230 and the analyze unit can also detect and analyze the position of the touch object O1 by the sizes of different areas on the fluorescent film 224 excited by the invisible light beam 210a or by the different intensity of fluorescent light beams 224a and 224b. Based on the previous description, the second area A2 of the fluorescent film 224 excited by the invisible light beam 210a with the blocking of the touch object O1 is larger than the first area A1 of the fluorescent film 224 excited by the invisible light beam 210a without the blocking of the touch object O1. Therefore, by analyzing the sizes of light emitting areas on the fluorescent film 224, the projection touch system 200 is capable of finding the position of the touch object O1. In addition, by the blocking of the touch object O1, the intensity of second fluorescent light beam 224b is greater than that of the first fluorescent light beam 224a. Therefore, by analyzing the distribution of the greater intensity of fluorescent light beam, the projection touch system 200 is capable of finding the position of the touch object O1. Accordingly, according to the positions of the plurality of touch objects, the projection touch system is capable of recognizing the positions and movements of the touch objects and the projection touch system is controlled according to the gesture of the touch objects.

Figure 3A:
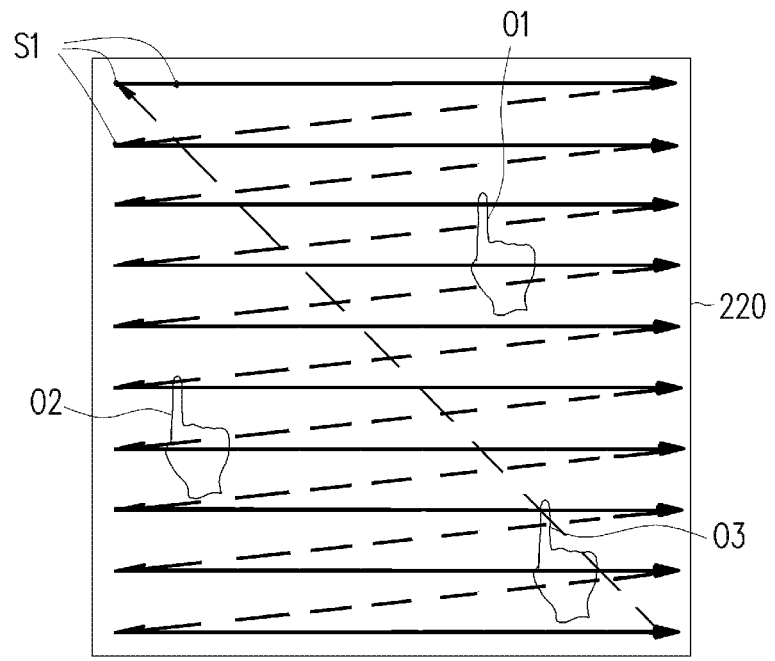
FIG. 3A is a top view of the projection touch system 200 according to the exemplary embodiment of the present invention.
Figure 3B:
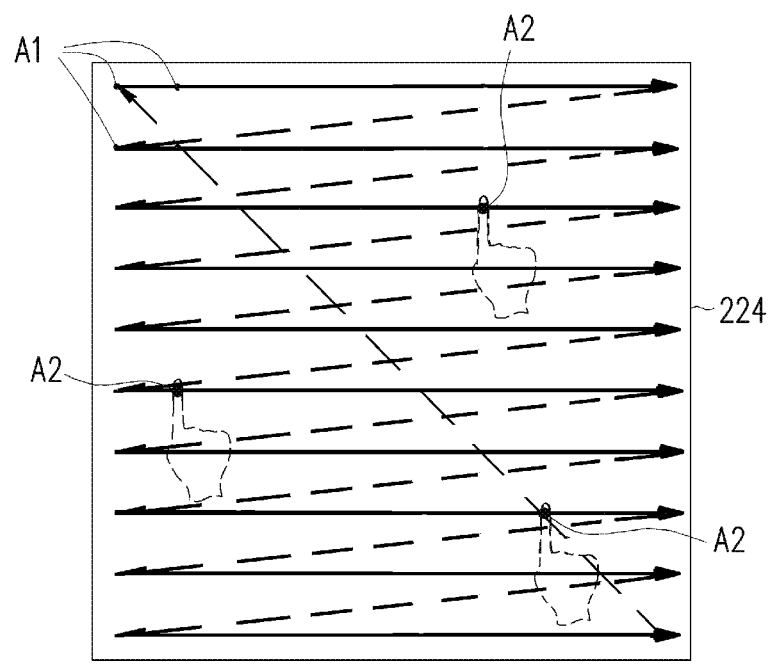
FIG. 3B is a top view of the fluorescent film 224 according to the exemplary embodiment of the present invention.

Referring to FIG. 3A and FIG. 3B, FIG. 3A is a top view of the projection touch system 200 and FIG. 3B is a top view of the fluorescent film 224 according to the exemplary embodiment of the present invention. To scan the projection panel 220, the invisible light beam forms a light spot S1 on the projecting panel 220 and scans the projection panel 220 horizontally and vertically with a high frequency rate. The invisible light beam repeats the scanning on the projection panel 220 for the projection touch system 200. Without the blocking of the touch object O1, the invisible light beam is able to penetrate through the projection panel 220. When the touch object O1 is touched to the projection panel 220, the invisible light beam is blocked by the touch object O1, so the invisible light beam is reflected (and scattered) by the touch object O1 back to the fluorescent film 224. As the result, referring to the FIG. 3B, the second area A2 of the fluorescent film 224 which emits the second fluorescent light beam 224b is larger than other first areas A1 of the fluorescent film 224 which emits the first fluorescent light beam 224a.

Although the light detector 230 and the invisible light source 210 are disposed separately in the FIGS. 2A and 2B, the light detector 230 follows the invisible light beam 210a to scan the projection panel 220 back and forth and detect the first fluorescent light beam 224a and the second fluorescent light beam 224b emitted from the fluorescent film 224. Since the first fluorescent light beam 224a and the second fluorescent light beam 224b are only emitted when the fluorescent film 224 is excited by the invisible light beam 210a, the light detector 230 scans with the invisible light beam 210a should obtain the correct detection. Therefore, by scanning the invisible light beam 210a on the projection panel 220, the first fluorescent light beam 224a or the second fluorescent light beam 224b is emitted from the fluorescent film 224, and the light detector 230 is able to detect the first fluorescent light beam 224a or the second fluorescent light beam 224b precisely. In addition, the light detector 230 and the invisible light source 210 can be integrated together as a single device (not illustrated herein).

Since the touch object O1 is only near or touched to the second side of the projection panel 220 opposite to the first side, the invisible light source 210 disposed at the first side of the projection panel 220 is capable of scanning all the projection panel 220 even the touch object O1 is existed. In other words, no dead zone is formed on the projection panel 220 due to the touch object O1. Therefore, the projection touch system 200 is possible of detecting a plurality of touch objects on the projection panel 220 at the same time. Referring to FIGS. 3A and 3B again, when the plurality of touch objects O1, O2 and O3 are near or touched to the projection panel 220 from the second side, at least a portion of the invisible light beam is reflected (and scattered) by each of the touch objects O1, O2 and O3. The fluorescent film 224 excited by the invisible light beam 210a emits the plurality of the second fluorescent light beams 224b. In FIG. 3B, the plurality of areas A2 are shown from the top view of the fluorescent film 224. Accordingly, the light detector 230 detects the plurality of second fluorescent light beams 224b and the analyzer unit analyzes the second fluorescent light beams 224b.

Figure 4:
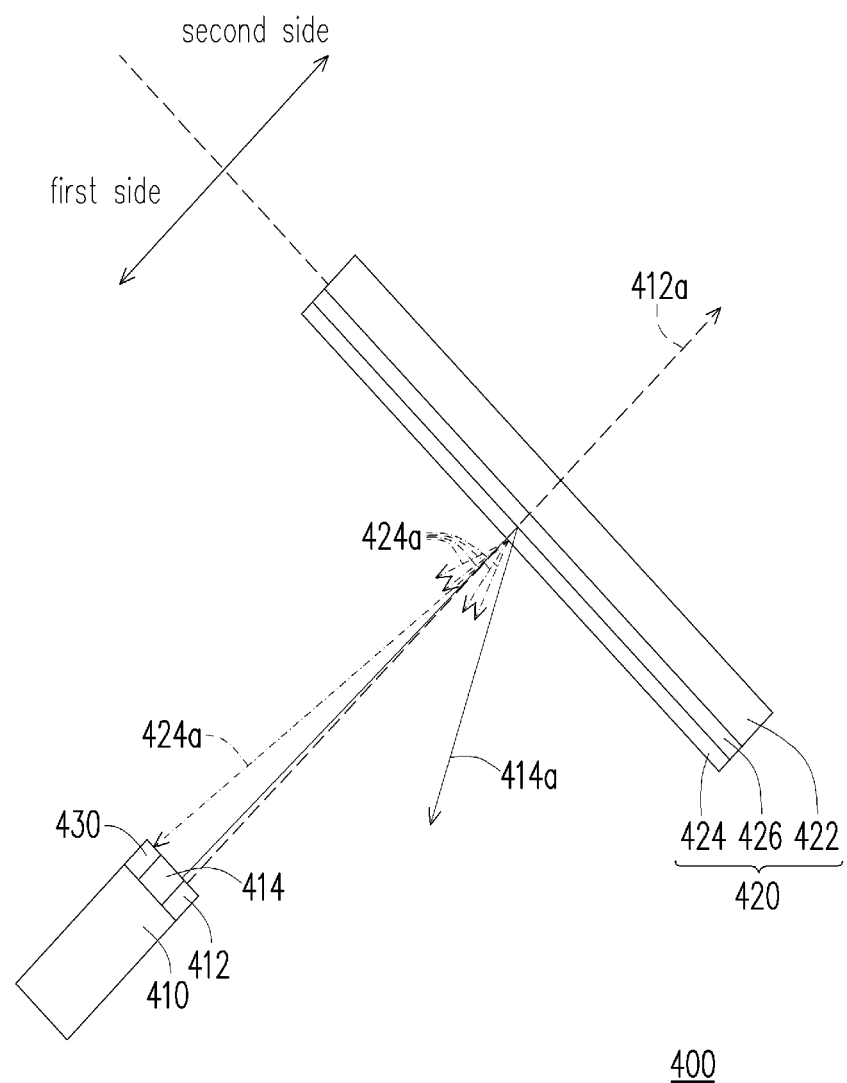
FIG. 4 is detailed schematic view of the projection touch system provided according to an exemplary embodiment of the present invention.

The optical touch system further includes a visible light source disposed at the first side of the projection panel which emits a visible light beam to scan back and forth on the projection panel. By doing so, an image is formed on the projection panel 220. The invisible light source 210, the visible light source and the light detector 230 can be integrated into a single device, for example, a projector. Referring to FIG. 4, FIG. 4 is detailed schematic view of the projection touch system provided in an embodiment of the present invention. The projection touch system 400 includes a projection panel 420 and a projector 410 having the invisible light source 412, the visible light source 414 and the light detector 430. In order to from the visible image on the projection panel 420, a projection sheet 426 is disposed between the transparent plate 422 and the fluorescent film 426. The projection sheet 426 reflects the visible light beam 414a to form the image on the projection panel 420. Also, the invisible light beam 412a emitted by the invisible light source 412 penetrates through the projection panel 420, and the first fluorescent light beam 424a emitted from the fluorescent film 424 is detected by the light detector 430. Accordingly, the projection touch system 400 is capable of detecting the position of the touch object and displaying the image on the projection panel 420. The visible light beam 414a is a laser beam in the embodiment of FIG. 4.

The image shown by the visible light beam 414a is a virtual input image, such as a keyboard image. Moreover, by scanning the visible light beam 414a back and forth on the projection panel 420 in high frequency rate, the projection touch system 400 is capable of displaying the video or using as a high quality display for portable device.

Figure 5:
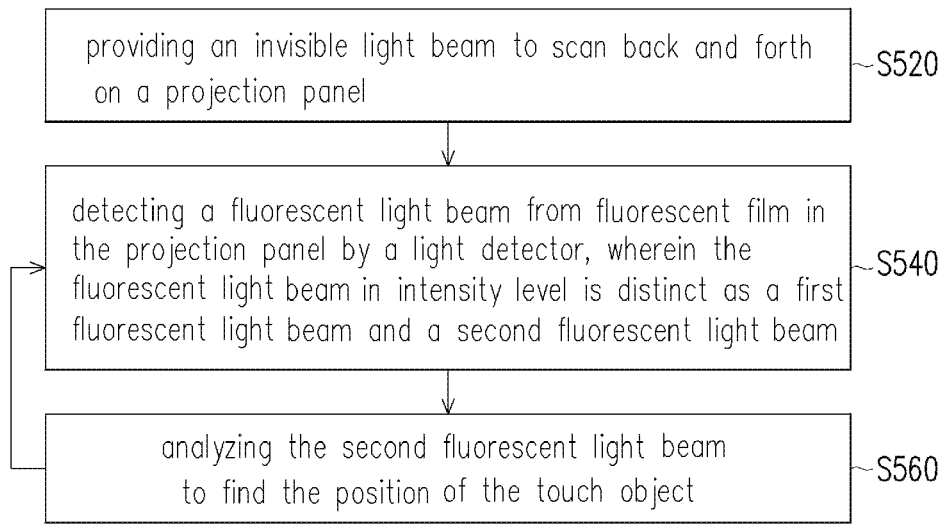
FIG. 5 illustrates a schematic flow chart for the projection touch method according to an exemplary embodiment of the present invention.

According to another exemplary embodiment of the present invention, a projection touch method is also provided for a projection touch system. Referring to FIG. 5, FIG. 5 illustrates a schematic flow chart for the projection touch method. In step 520, an invisible light beam is provided to a projection panel to scan back and forth. The invisible light beam is an infrared beam or other kinds of light beam emitted by the invisible light source. In step 540, a fluorescent light beam from a fluorescent film in the projection panel is detected by a light detector, where the fluorescent light beam in intensity level is distinct as a first fluorescent light beam and a second fluorescent light beam. The invisible light beam scans the projection panel back and forth, and the light detector detects a first fluorescent light beam and a second fluorescent light beam which are emitted from the fluorescent film and different in intensity level. Based on the above description, the first fluorescent light beam is emitted from the fluorescent film when the invisible light beam penetrates through the projection panel, and the second fluorescent light beam is emitted from the fluorescent film when the invisible light beam reaches the projection panel, and at least a portion of the invisible light beam is reflected or scattered back to the fluorescent film by the touch object. The light detector also scans and detects the first fluorescent light beam and the second fluorescent light beam. However, the present invention is not limited herein, and the light detector can be a fixed device to detect the first fluorescent light beam and the second fluorescent light beam without scanning the projection panel.

In step 560, the second fluorescent light beam and the first fluorescent light beam is analyzed by an analyze unit or other devices, such as a processor, in the light detector to find the position of the touch object. Furthermore, the first fluorescent light beam is also detected and analyzed by the analyze unit in the light detector, but the first fluorescent light beam is not the key for finding the position of the touch object. Since the intensity of the second fluorescent light beam is greater than the intensity of the first fluorescent light beam, the difference (a threshold) can be used to distinguish the first and the second fluorescent light beams by the analyze unit. When the step 560 is completed, the projection touch method can start over from the step 540 again until the projection touch system is shut down.

Figure 6:
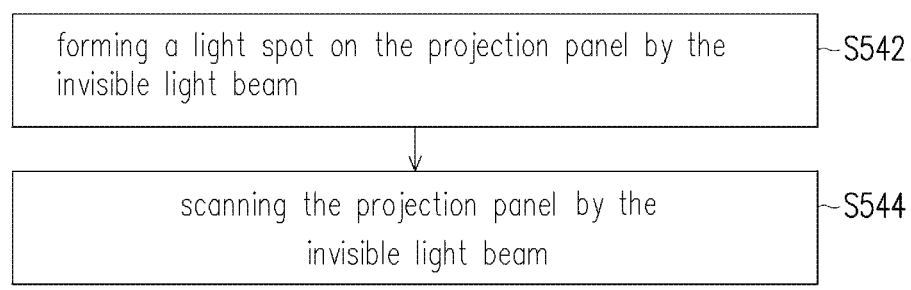
FIG. 6 is a detailed flow chart of the step 540 according to the exemplary embodiment of the present invention.

Referring to FIG. 6, FIG. 6 is a detailed flow chart of the step 540 according to the exemplary embodiment of the present invention. In step 542, a light spot is formed by the invisible light beam on the projection panel. In step 544, the invisible light beam scans the projection panel. When the invisible light beam starts scanning process, the light spot is also moved on the projection panel. Moreover, the step 544 further includes that, the light detector follows the invisible light beam to scan the projection panel and detect the first fluorescent light beam and the second fluorescent light beam emitted from the fluorescent film (not illustrated in FIG. 6). As the result, by scanning the invisible light beam on the projection panel, the light detector is able to detect the first fluorescent light beam or the second fluorescent light beam precisely.

As mentioned in the above description, the step of analyzing the second fluorescent light beam is capable of analyzing the plurality of second fluorescent light beams to find the positions of the plurality of touch objects. Since the invisible light beam scans the projection panel, the light detector may detect the second fluorescent light beam for more than once. By analyzing the plurality of second fluorescent light beams, the touch objects can be found. Accordingly, according to the positions of the plurality of touch objects, the projection touch system is capable of recognizing the movements of the touch objects and the projection touch system is able to react according to the gesture of the touch objects.

Moreover, the projection touch method further includes the step of emitting a visible light beam to scan the projection panel back and forth in order to form an visible image on the projection panel. The visible light beam can scan the projection panel with the invisible light beam, and the image can be the image of virtual input device such as a keyboard. Further, a video can be displayed by scanning the visible light beam in a high frequency rate.

In summary, according to the exemplary embodiments of the present invention, the projection touch system and the projection touch method thereof are capable of detecting a plurality of touch objects on the projection panel. By analyzing the second fluorescent light beam emitted from the excited fluorescent film in the projection panel, the projection touch system detects and finds the positions of the plurality of touch objects so as to react according to the positions of the touch objects. Further, the visible light beam in the projection touch system also enables the image projection function. Thus, the projection touch system includes both the positioning and displaying functions.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A projection touch system, configured for detecting a position of a touch object, comprising:
    an invisible light source, emitting an invisible light beam;
    a projection panel, wherein the invisible light source is disposed at a first side of the projection panel, comprising:
    a transparent plate; and
    a fluorescent film, disposed between the transparent plate and the invisible light source, and the invisible light beam scans back and forth on the projection panel,
    wherein when the invisible light beam penetrates through the transparent plate and the fluorescent film, the fluorescent film excited by the invisible light beam emits a first fluorescent light beam,
    wherein when the touch object is near or touched to the projection panel from a second side of the projection panel opposite to the first side and the invisible light beam reaches to the touch object, at least a portion of the invisible light beam is reflected by the touch object back to the fluorescent film and the fluorescent film excited by the invisible light beam emits a second fluorescent light beam;
    a light detector, disposed at the first side of the projection panel to detect the second fluorescent light beam relative to the first fluorescent light beam by an intensity level; and
    an analyze unit, finding the position of the touch object according to the first fluorescent light beam and the second fluorescent light beam detected by the light detector.

2. The projection touch system as claimed in claim 1, wherein an intensity of the second fluorescent light beam is greater than an intensity of the first fluorescent light beam.

3. The projection touch system as claimed in claim 1, wherein when the invisible light beam penetrates through the transparent plate and the fluorescent film, a first area of the fluorescent film excited by the invisible light beam emits the first fluorescent light beam, wherein when the touch object is near or touched to the projection panel from the second side of the projection panel opposite to the first side and the invisible light beam reaches to the touch object, at least the portion of the invisible light beam is further reflected by the touch object back to the fluorescent film, a second area of the fluorescent film excited by the invisible light beam emits the second fluorescent light beam, a size of the second area is larger than a size of the first area.

4. The projection touch system as claimed in claim 1, wherein the light detector follows the invisible light beam to scan the projection panel and detect the first fluorescent light beam and the second fluorescent light beam.

5. The projection touch system as claimed in claim 1, further comprising:
    a visible light source, disposed at the first side and emitting a visible light beam, wherein the visible light beam scans back and forth on the projection panel, an image is formed by the visible light beam on the projection panel.

6. The projection touch system as claimed in claim 5, wherein the projection panel further comprising:
    a projection sheet, disposed between the transparent plate and the fluorescent film, wherein the projection sheet reflects the visible light beam in order to form the image on the projection panel.

7. The projection touch system as claimed in claim 5, wherein the visible light beam is a laser beam.

8. The projection touch system as claimed in claim 5, wherein the invisible light source, the visible light source and the light detector are integrated into a projector.

9. The projection touch system as claimed in claim 1, wherein when a plurality of touch objects are near or touched to the projection panel from the second side of the projection panel, the invisible light beam reaches each of the touch objects, and at least the portion of the invisible light beam is reflected by each of the touch objects back to the fluorescent film, the fluorescent film emits the plurality of the second fluorescent light beams, and the light detector detects the plurality of second fluorescent light beams.

10. The projection touch system as claimed in claim 1, wherein the invisible light beam is an infrared beam.

11. The projection touch system as claimed in claim 1, wherein the light detector is a photodiode.

12. A projection touch method, adapted for a projection touch system to detect a position of a touch object, comprising:
    providing an invisible light beam to scan back and forth on a projection panel;
    detecting a fluorescent light beam from a fluorescent film in the projection panel by a light detector, wherein the fluorescent light beam is distinct as a first fluorescent light beam and a second fluorescent light beam in intensity level; and
    analyzing the second fluorescent light beam to find the position of the touch object,
    wherein the first fluorescent light beam is emitted from the fluorescent film when the invisible light beam penetrates the projection panel, the second fluorescent light beam is emitted from the fluorescent film when the invisible light beam reaches the touch object and at least a portion of the invisible light beam is further reflected by the touch object back to the fluorescent film when the touch object is near or touched to the projection panel.

13. The projection touch method as claimed in claim 12, wherein an intensity of the second fluorescent light beam is greater than an intensity of the first fluorescent light beam.

14. The projection touch method as claimed in claim 12, wherein the projection touch method further comprising:
    following the invisible light beam to scan the projection panel and detecting the fluorescent light beam by the light detector.

15. The projection touch method as claimed in claim 12, wherein the projection touch method further comprising:

emitting a visible light beam to scan the projection panel back and forth in order to form an image on the projection panel.

\* \* \* \* \*